United States Patent [19]
O'Connor et al.

[11] 3,838,566
[45] Oct. 1, 1974

[54] SOLID STATE WATCH HAVING COARSE AND FINE TUNING

[75] Inventors: Arthur Herman O'Connor; John Leslie Pere, both of Lancaster, Pa.
[73] Assignee: Time Computer, Inc., Lancaster, Pa.

[22] Filed: June 13, 1973
[21] Appl. No.: 369,716

[52] U.S. Cl. .................... 58/50 R, 58/85.5, 310/8.1, 331/177 R
[51] Int. Cl. ....................... G04b 19/30, G04b 27/02
[58] Field of Search ....... 58/23 R, 23 A, 50 R, 85.5; 310/8.1; 331/116 R, 177 R

[56] References Cited

UNITED STATES PATENTS

| | | | |
|---|---|---|---|
| 3,576,099 | 4/1971 | Walton | 58/50 R |
| 3,664,118 | 5/1972 | Walton | 58/23 A X |
| 3,676,801 | 7/1972 | Musa | 58/23 AD |
| 3,714,867 | 2/1973 | Dargent | 58/50 R |
| 3,754,152 | 8/1973 | Koehler et al. | 331/116 R X |

*Primary Examiner*—Edith Simmons Jackmon
*Attorney, Agent, or Firm*—LeBlanc & Shur

[57] ABSTRACT

Disclosed is a solid state electronic wristwatch having an electro-optical display in the form of light-emitting diodes. The display is energized from a high frequency quartz crystal oscillator by way of a frequency divider and a display actuator. The oscillator is provided with both coarse and fine tuning capacitors which are preset to provide increased time-keeping accuracy.

7 Claims, 9 Drawing Figures

SOLID STATE WATCH HAVING COARSE AND FINE TUNING

This invention relates to a solid state timepiece and more particularly to an electronic wristwatch which employs substantially no moving parts. In the present invention a frequency standard in the form of a crystal oscillator acts through solid state electronic circuit dividers and drivers to power in timed sequence the light-emitting diodes of an electro-optical display. In particular, the present invention is directed to an improved oscillator construction for increasing the timekeeping accuracy of the wristwatch.

Battery powered wristwatches and other small portable timekeeping devices of various types are well known and are commercially available. The first commercially successful battery powered wristwatch was of the electromechanical type shown and described in U.S. Reissue Pat. No. Re. 26,187, reissued Apr. 4, 1967 to John A. Van Horn et al. for Electronic Watch.

In recent years, considerable effort has been directed toward the development of a wristwatch which does not employ an electromechanical oscillator as the master reference. For example, in assignee's U.S. Pat. No. 3,560,998, issued Feb. 2, 1971, there is shown a wristwatch in which the master time reference is formed by a high frequency oscillator connected to the watch display through a divider formed of low power complementary MOS transistor circuits. In assignee's U.S. Pat. No. 3,576,099, issued Apr. 27, 1971, there is disclosed a watch construction in which the optical display is described as a plurality of light-emitting diodes which are intermittently energized to assure minimum power consumption and an increasingly long life for the watch battery. Improved watch constructions of this general type incorporating solid state circuits and integrated circuit techniques are disclosed in assignee's U.S. Pat. No. 3,672,155.

The present invention is directed to an improved watch construction of the same general type as disclosed in the above-mentioned patents but one which utilizes an improved oscillator construction to increase the accuracy of the time display.

Previous electronic wristwatch oscillators have been of the type shown, for example, in assignee's U.S. Pat. No. 3,664,118 as formed from a single complementary symmetry MOS inverter comprising a PMOS and an NMOS with source-drain circuits connected between the opposite sides of the wristwatch power supply battery. In circuits of this type oscillations are sustained by a piezoelectric quartz crystal connected between the gate and drain circuits of the inverter. Fine adjustment of the operating frequency of the quartz crystal oscillator is obtained by an adjustable capacitor which is used to vary the frequency of the oscillator output over a very limited range. An oscillator of this type in which the variable capacitor or trimmer is accessible through removal of the back of the watch case is shown and described in assignee's copending U.S. Pat. application Ser. No. 220,922, filed Jan. 26, 1972 now U.S. Pat. No. 3,759,031.

One of the generally accepted advantages of a quartz crystal watch is the increased timekeeping accuracy it offers relative to previous constructions. However, it has been found that when the wristwatch is provided with a digital type of time display even relatively minor deviations from the correct time are noticeable. For example, when the seconds of time are continuously displayed as they advance over any significant time interval, variations from correct time of as little as one second may be noticed by the wearer and can be cause for his desire to reset the wristwatch. Even this small time deviation may be noticed when the seconds count of two watches are compared in a side-by-side manner such as when two watch wearers compare the seconds display of their respective watches.

Because of this it is desirable that the already extreme accuracy of a digital display type crystal controlled wristwatch be further increased. To this end, the present invention provides an improved crystal oscillator construction for use as the basic time standard or frequency standard of an electronic wristwatch and particularly a wristwatch incorporating a digital numerical display of the seconds of time. In the present invention the crystal oscillator forming the frequency standard or time reference is comprised of a single CMOS inverter whose output frequency is under the control of a piezoelectric quartz crystal. However, as distinguished from previous constructions, the quartz crystal oscillator of this invention is provided with two variable capacitors for both coarse and fine adjustment of the oscillator output frequency.

The coarse trimmer or coarse variable capacitor is incorporated in the body of the wristwatch. It provides a relatively wide range of frequency adjustment and is set at the factory to match the particular quartz crystal incorporated in that wristwatch to produce the desired frequency output. Once the coarse frequency tuner has been set at the factory it is intended for further adjustment only if the watch is returned to the factory for replacement or repair.

On the other hand, the fine trimmer or fine variable capacitor in the wristwatch of the present invention is mounted within the wristwatch case so that it is readily accessible for adjustment by the owner or watchmaker through simple and quick removal of the back-plate of the watch case. The fine tuner as its name implies permits adjustment of the oscillator frequency only over a limited frequency range and may, if necessary, be periodically adjusted to compensate for slight long term variations in the oscillator frequency. Moreover, it is an important feature of this invention that the fine trimmer is initially set at the factory in combination with the coarse trimmer to produce the desired output frequency such that the fine trimmer or fine variable capacitor is initially factory set as close as possible to the mid point of its range. In this way, it is possible by suitable indicia or pamphlet instructions to notify the owner or watchmaker as to which direction the fine tuner should be turned to increase or decrease respectively the frequency of the oscillator output and by approximately how much a given turning or adjustment will change the output frequency.

It is therefore one object of the present invention to provide an improved crystal controlled electronic wristwatch.

Another object of the present invention is to provide a solid state electronic wristwatch having increased timekeeping accuracy.

Another object of the present invention is to provide an electronic wristwatch including a time base or frequency standard with both coarse and fine frequency adjustment.

Another object of the present invention is to provide an improved crystal controlled oscillator for wristwatches.

Another object of the present invention is to provide an improved crystal controlled oscillator for a wristwatch in which the seconds of time are adapted to be displayed over a significant time interval in digital numerical form.

Another object of the present invention is to provide an electronic solid state wristwatch which is placed in correct operating condition at the factory.

Another object of the present invention is to provide a solid state electronic timepiece with a crystal time base oscillator having both coarse and fine tuners which are preset in combination with each other to the proper frequency such that the fine tuner is as close as possible to the mid point of its tuning range.

A further object of the present invention is to provide both a coarse and fine tuner for a crystal controlled wristwatch in which the coarse tuner is preset at the factory while the fine tuner is accessible through the back case of the wristwatch for later adjustment by the owner or watch repairshop.

These and further objects and advantages of the invention will become more apparent upon reference to following specification, claims and appended drawings wherein:

Figure 1:
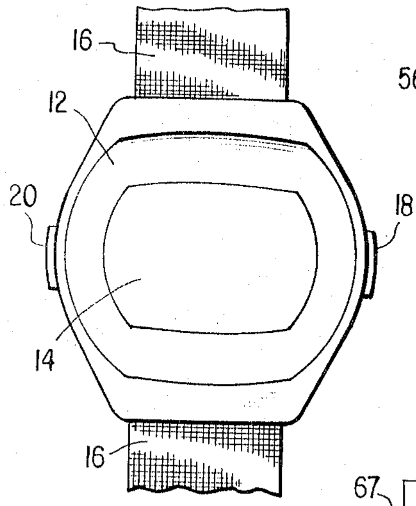
FIG. 1 is a plan view of a wristwatch and a portion of a wristwatch bracelet constructed in accordance with the present invention.
Figure 2:
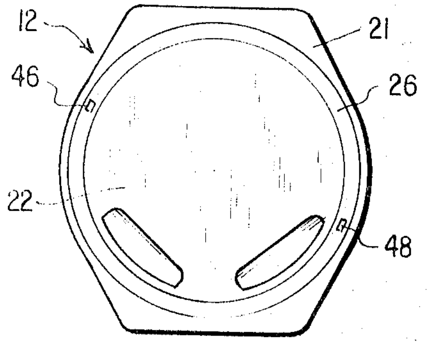
FIG. 2 is a rear plan view of the watch of FIG. 1 showing the watch case completely assembled.

Referring to the drawings, FIG. 1 is a top plan view of a wristwatch constructed in accordance with the present invention. The watch generally indicated at 10 comprises a non-magnetic watch case 12 having a viewing window 14. The window is preferably formed by a suitable red light filter such as transparent red plastic or ruby material. Attached to case 12 is a wristwatch bracelet 16 and mounted on the case is a pushbutton demand switch 18. Also mounted on the watch case at the edge opposite from demand switch 18 is a similar date switch 20. As shown in FIG. 2, watch case 12 is preferably constructed from a cover 21 and backplate 22 so that no shafts or electrical connections pass through the watch case to the interior of the watch and all elements are sealed from the outside. Pushbuttom switches 18 and 20 are preferably of identical construction and carry permanent magnets so that when they are depressed reed switches inside the watch case are actuated, as more fully shown and described in assignee's copending U.S. Pat. application Ser. No. 138,557, filed Apr. 29, 1971, now U.S. Pat. No. 3,782,102, the disclosure of which is incorporated herein by reference.

FIG. 2 is a back plan view of a completely assembled watch case. The backplate 22 of the case is secured to the cover 21 by an annular, threaded ring 26. Ring 26 is preferably provided with a pair of diametrically opposite indentations 46 and 48 adapted to be engaged by the ends of a bifurcated tool so that the ring may be rotated and the backplate 22 readily removed.

Figure 3:
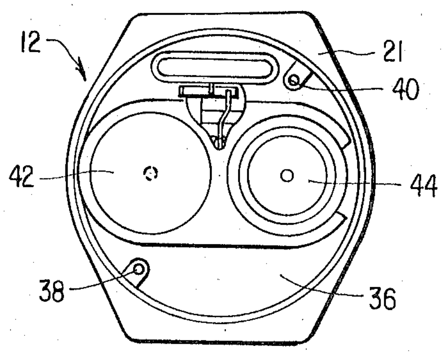
FIG. 3 illustrates the watch case of FIG. 2 with the back plate removed.

FIG. 3 is a view similar to that of FIG. 2 with the ring 26 and backplate 22 removed. Received within the cover 21 is a frame 36 forming part of a timekeeping module which frame is adapted to be secured to the cover by a pair of mounting screws 38 and 40 which pass through the frame and are threadedly received into the inside of the front wall of the cover. Frame 36 is provided with a pair of circular cavities 42 and 44, each of which is adapted to receive a 1 ½ volt one cell battery. The batteries are connected in series to form a conventional wristwatch battery power supply of nominally 3 volts.

Figure 4:
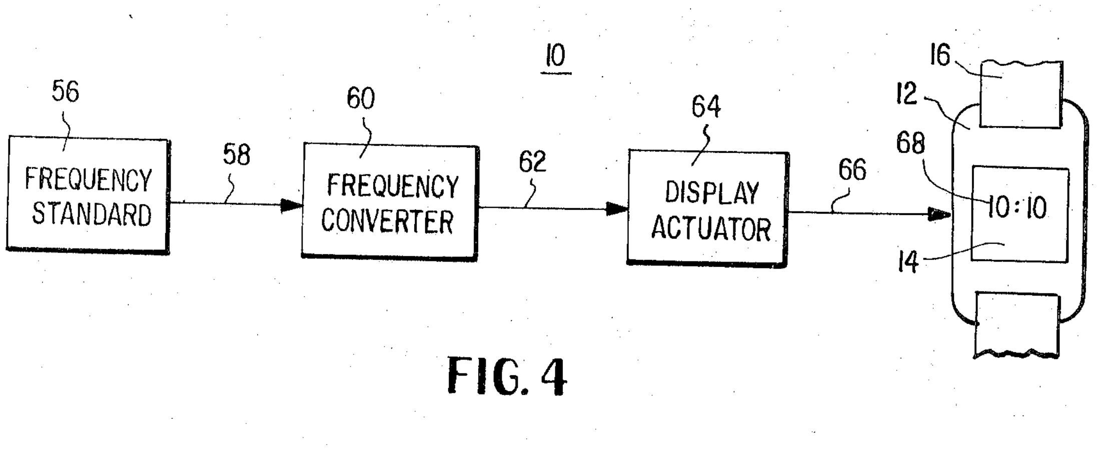
FIG. 4 is a simplified block diagram of the electrical circuit for the timekeeping portion of the wristwatch of the present invention.

FIG. 4 is a simplified block diagram of the principal timekeeping components of the watch of the present invention. These comprise a time base or frequency standard 56, in the form of a crystal oscillator producing an electrical output on lead 58 preferably at a frequency of 32,768 Hz. This relatively high frequency is supplied to a frequency converter 60 in the form of a divider which divides down the frequency from the standard 56 so that the output from the converter 60 appearing on lead 62 is at a suitable timekeeping frequency such as 1 Hz. This signal is supplied to a display actuator 64 which in turn drives an electro-optical display indicated at 68 and viewable through window 14 by way of electrical lead 66. While only an hours and minutes display is shown it is understood that with the operation of a pushbutton 18 of FIG. 1 the hours and minutes are first displayed for a predetermined time and if the pushbutton remains depressed the hours and minutes are extinguished and the seconds become visible. The same display diodes are used for both minutes and seconds since these are not displayed simultaneously, thus minimizing the power drain from the watch battery.

In normal operation, time is continuously being kept but is not displayed through the window 14. That is, no indication is visible through the window and this is the normal condition which previals in order to conserve battery energy in the watch. However, even though the time is not displayed through the window 14, it is understood that the watch continuously keeps accurate time and is capable of accurately displaying this time at any instant. When the wearer or operator desires to ascertain the correct time, he depresses the pushbutton 18 with his finger and the correct time is immediately displayed at 68 through window 14 which shows a light-emitting diode display giving the correct time reading of 10:10; namely, 10 minutes after 10 o'clock. The hours and minutes, i.e., 10:10, are displayed through the window 14 for a predetermined length of time, preferably 1 ¼ seconds, irrespective of whether or not the pushbutton 18 remains depressed. The exact time of the display is chosen to give the wearer adequate time to consult the display to determine the hour and minute of time. Should the minutes (or hours) change during the time of display, this change is immediately indicated by advancement of the minute (or hour) reading to the next number, i.e., 11, as the watch is being read. If the pushbutton 18 remains depressed at the end of 1 and ¼ seconds, the hours and minutes are extinguished, i.e., they disappear and simultaneously the seconds reading is displayed through the window 14 by the same diodes as previously displayed the minutes. The advancing seconds cycling from 0 to 59 continue to be displayed through the window 14 until the pushbutton 18 is released.

Pushbutton 18 is a read switch or a demand switch which is depressed when the wearer desires the time to be displayed. Incorporated in the watch 10 of FIG. 1 is a second pushbutton switch 20 identical in construction and hereafter referred to as the date switch. When the pushbutton 20 of the date switch is depressed, the date, month, and the a.m. or p.m. of time are displayed by the same diodes that display time in response to depression of pushbutton 18. However, contrary to the former when the date buttom 20 is depressed, the day, month, a.m. or p.m. of time are displayed so long as button 20 remains depressed and are immediately extinguished when the date button 20 is released.

Figure 5:
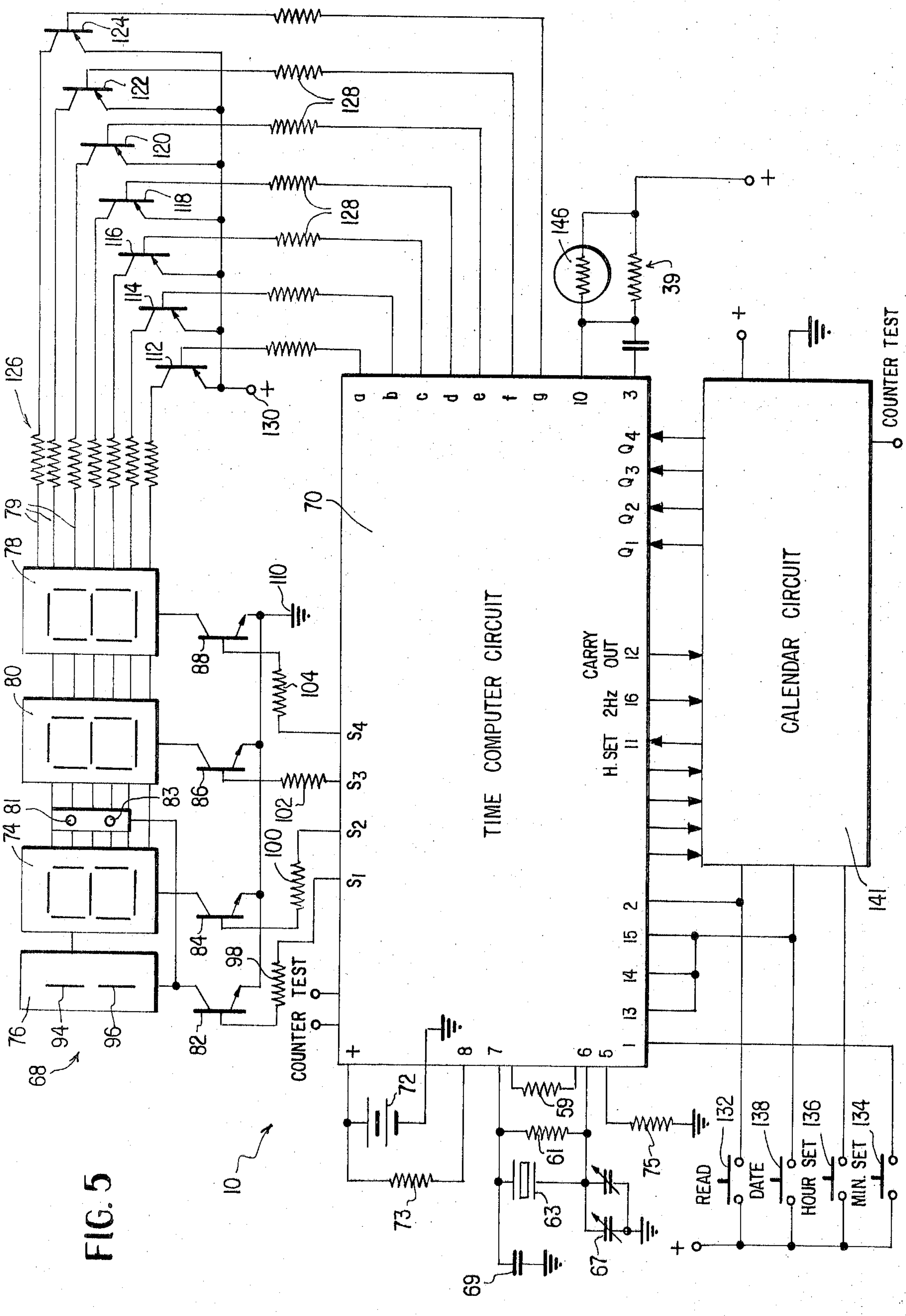
FIG. 5 is an overall electrical circuit diagram of the watch of the present invention showing the timekeeping and calendar portions of the circuitry in block form.

FIG. 5 is an overall circuit diagram of the wristwatch 10 of this invention. The overall construction will not be described in detail since with the exception of the oscillator as previously discussed the watch construction and operation is the same as that more fully shown and described in assignee's copending U.S. Pat. application Ser. No. 328,639, filed Feb. 1, 1973, the disclosure of which is incorporated herein by reference.

Figure 7:
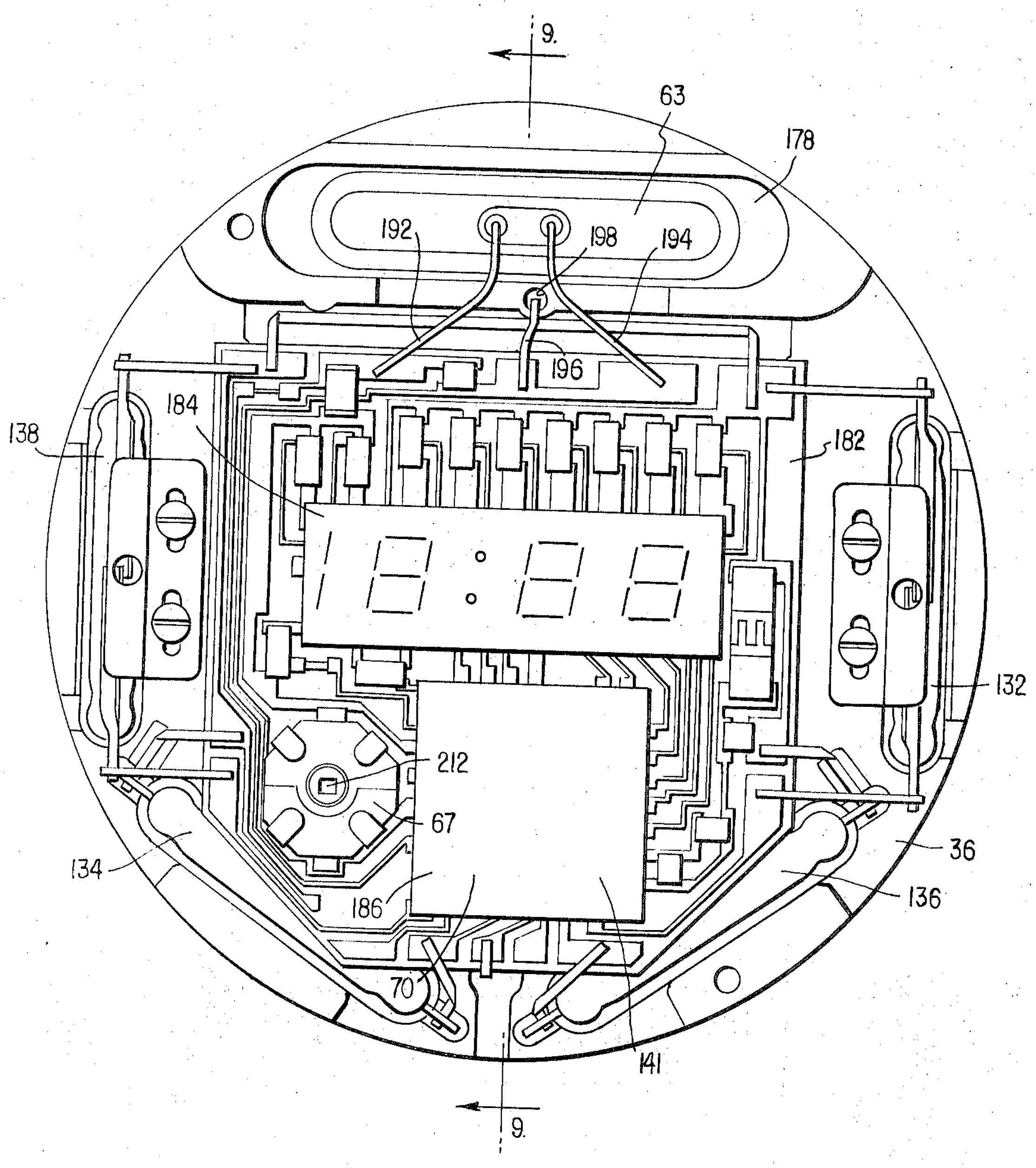
FIG. 7 is a plan view of the display side of the timekeeping module incorporated in the wristwatch of FIG. 1.

Briefly, the watch 10 comprises a time computer circuit indicated by the large block 70 in FIG. 5 and a calendar circuit indicated by the large block 141. These blocks are preferably formed of CMOS large scale integrated circuits and blocks 70 and 141 are preferably formed on a single large scale integrated circuit chip. In addition to the integrated circuits 70 and 141 the watch comprises a battery 72 which by way of example only may comprise a conventional 3 volt wristwatch battery formed from two 1 ½ volt cells connected in series. Connected to the positive side of the battery is a current limiting resistor 73 and the battery energizes the light-emitting diode display 68 which is shown in FIG. 7 as consisting of a pair of hours stations comprising the digits station 74 and tens stations 76 and a pair of combination minutes and seconds stations comprising digits station 78 and tens station 80. In addition, the display 68 includes a pair of colon dots 81 and 83 each formed by a single light-emitting diode. The display stations are energized from integrated circuit 70 connected to battery 72 by way of a plurality of leads 79. The circuit is completed from lead 79 to the anodes of the light-emitting diodes and the cathodes of the light-emitting diodes are individually connected to the other side of the power supply through strobing or switching NPN junction transistors 82, 84, 86 and 88. There is a separate lead 79 for the total number of bar segments in a display station. That is, with a seven bar segment display, there are seven leads 79, each one connected to a separate bar segment of each station (except the hours tens station) as more fully described below. However, all the cathodes of each station are connected in common through the NPN junction transistor for that display. The two bar segments 94 and 96 for the hours tens display have their cathodes connected to the transistor 82 as do the colon dots 81 and 83. All the cathodes of the hours units station 74 are connected to transistor 84. Display stations 78 and 80 are used to display both minutes and seconds and station 80 has the cathodes of all diodes connected to the transistor 86 and all the cathodes of display station 78 are similarly connected to transistor 88. These transistors have their bases returned to the integrated circuit 70 through current limiting resistors 98, 100, 102 and 104, the emitters of the transistors being connected in common to ground, i.e., the negative side of the power supply battery 72 as indicated at 110.

The annodes of the bar segment diodes are energized from bipolar driver transistors 112, 114, 116, 118, 120, 122, and 124. Since the greatest number of bar segments in any display station is seven, there are seven driver transistors and seven leads 79. The transistor collectors are connected to the display diodes through individual ones of current limiting resistors 126 and the driver transistor bases are connected to the integrated circuit 70 through protective resistors 128. The emitters of the driver transistors are connected in common to the positive side 130 of power supply battery 72.

The external components of the oscillator frequency standard 56 in FIG. 5 (excluding the trimmers described below) are the crystal 63, current limiting resistors 73 and 75, a 20 megohm feedback resistor 61, output resistor 59, and grounded capacitor 69. The active components or oscillator transistors are incorporated in the integrated circuit 70. Also external to the integrated circuit is a demand or read switch 132 which is closed when putton 18 of FIG. 1 is depressed. Further manually operated switches external to the integrated circuit 70 are minutes set switch 134 and hours set 136. Also external to the integrated circuits is a light intensity control circuit generally indicated at 39 in FIG. 5 including a light sensitive resistor 146 for changing the brightness of the display in accordance with ambient light. That is, the diode light intensity is increased for greater contrast when the ambient light is bright, such as during daytime display whereas the intensity of light from the diodes is decreased when the ambient light decreases. The photosensitive resistor 146 is suitably mounted on the face of the watch to sense the intensity of ambient light.

Also shown in FIG. 5 is the calendar circuit 141. This circuit is used for displaying on the same display stations 74, 76, 78 and 80 (and colon dots) the date, month, and a.m. and p.m. of time. The month in decimal number is displayed on stations 74 and 76, the day of the month in decimal number on stations 78 and 80. Illumination of colon dot 81 indicates a.m. of time and illumination of colon dot 83 indicates p.m. of time. All display stations are suitably illuminated to display this date information when the date button 20 of FIG. 1 is depressed and the date switch 138 of FIG. 5 closed as more fully shown and described in the previously referenced copending U.S. Pat. application Ser. No. 328,639, filed Feb. 1, 1973. Resetting of both the time and calendar information is accomplished by closing one or more of the switches 132, 138, 136 and 134 in FIG. 5.

Figure 6:
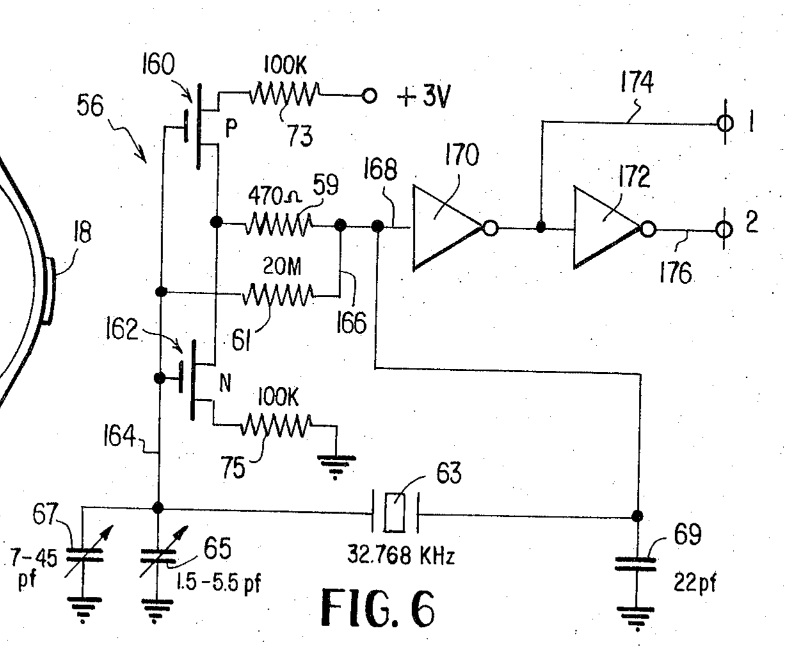
FIG. 6 is a detailed circuit diagram of a crystal controlled oscillator constructed in accordance with the present invention and forming the frequency standard or time base of the wristwatch.

FIG. 6 is a detailed circuit diagram of the novel oscillator of the present invention in which like parts bear reference numerals. In addition to the components previously described, the oscillator includes a complementary symmetry MOS inverter formed from a P-channel enhancement MOS transistor 160 and an N-channel enhancement mode MOS transistor 162. The gates of the two transistors are connected together and to the coarse trimmer 67 and fine trimmer 65 by means of a lead 164. The gates are also connected to one side of 20 megohm resistor 61. The other side of this resistor is connected by a lead 166 to one side of 470 ohm resistor 59, the other side of this latter resistor being connected to the common drain connection of transistors 160 and 162. The source of P-channel transistor 160 is connected to the positive side of the power supply through 100 kilohm resistor 73 and the source of N-channel transistor 162 is returned to the negative side of the power supply through 100 kilohm resistor 75. The substrate of transistor 162 is returned directly to the negative side of the power supply and the substrate of transistor 160 is returned directly to the positive side of the power supply. The output of the oscillator 56 on lead 168 is passed through a pair of CMOS inverters 170 and 172 to obtain the complementary pulse outputs $\phi 1$ and $\phi 2$ on the respective leads 174 and 176 for driving the frequency converter 60 which is preferably in the form of a CMOS binary frequency divider chain.

Figure 8:
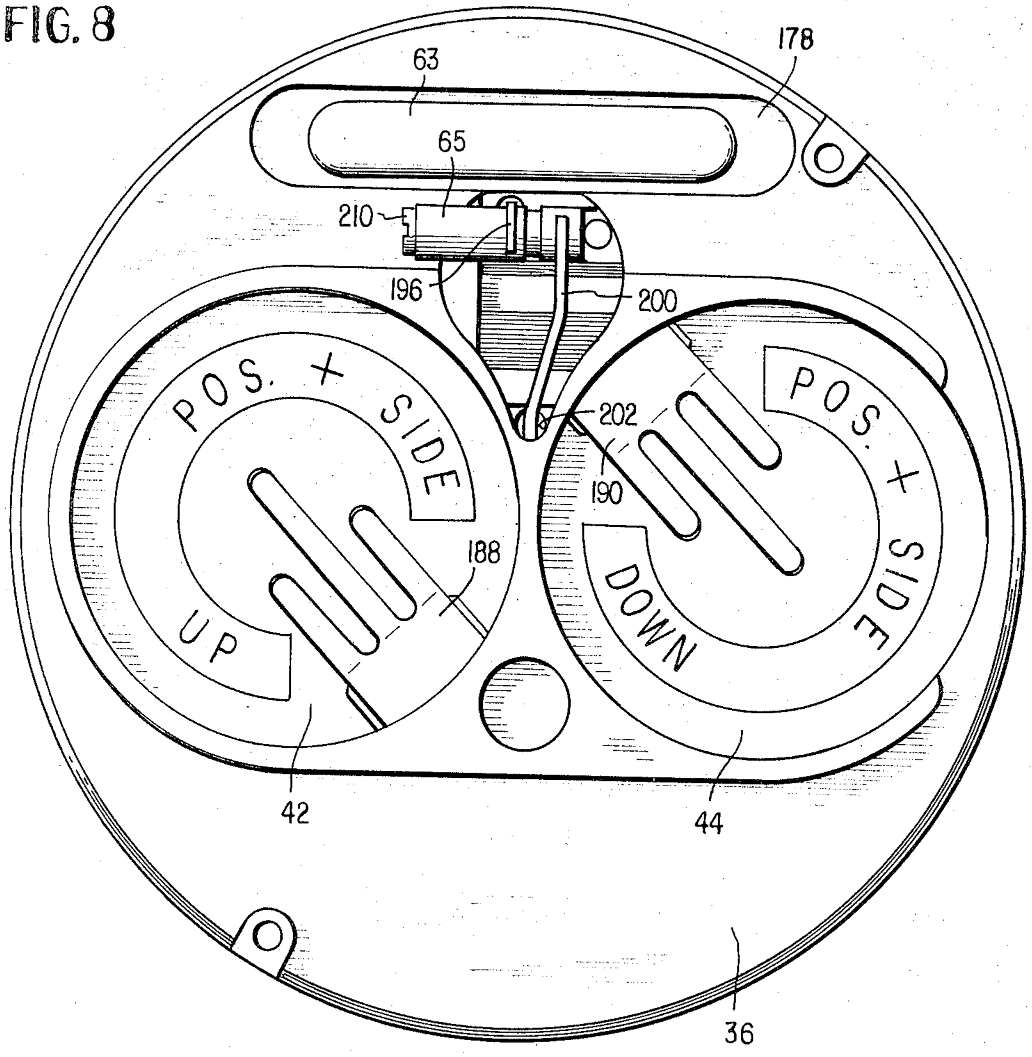
FIG. 8 is a plan view of the back or battery side of the timekeeper module of FIG. 7.
Figure 9:
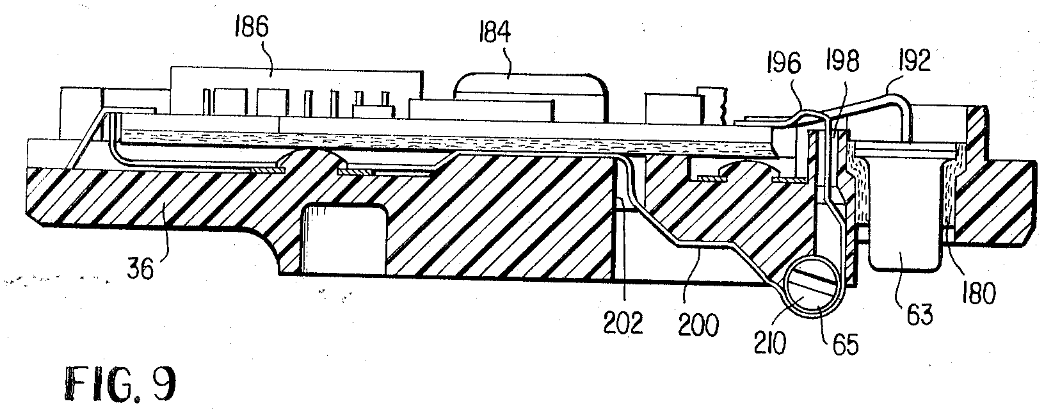
FIG. 9 is a cross section through the module taken along line 9—9 of FIG. 7.

FIG. 7 is a display side plan view of the frame 36 of FIG. 3. FIG. 8 is a back side plan view of the frame and FIG. 9 is a cross section through the frame taken along line 9—9 of FIG. 7. The frame is in the form of a circular disc constructed of suitable electrically insulating plastic material. In the preferred embodiment, frame 36 is formed from an impact resistant, one piece, injection-molded plastic material and by way of example only may be identified as S-2/30 type 6–10 nylon which is a fiber filled nylon material. The frame is provided with a suitable aperture 178 extending all the way through it and receiving the quartz crystal 63 which is secured in the aperture by a resilient epoxy 180. Also mounted on the frame is a ceramic substrate 182 containing the printed circuitry and supporting the discrete components previously described. Also mounted on the substrate is a display package 184 which contains the light-emitting diode display stations 76, 74, 80, 78 and the colon dots 81 and 83 previously described. The integrated circuits 70 and 141 are formed on a single integrated circuit chip 186 also mounted on substrate 182. The edges of frame 36 are provided with four wells or cavities receiving the reed switches 132, 134, 136 and 138 of FIG. 5. Finally, substrate 182 also mounts the coarse trimmer 67.

Referring to FIG. 8, frame 36 on its back side is provided with a pair of circular wells or cavities 42 and 44 for receiving the battery cells previously described. A pair of angularly extending resilient springs 188 and 190 are provided, one in each well for establishing electrical contact to the underside of the battery received in that well. Also mounted on the back side of frame 36 where it is accessible by removal of the back case 22 of the watch as illustrated in FIG. 2 is the fine trimmer 65.

Referring to FIG. 7, crystal 63 is connected by a pair of leads 192 and 194 to a pair of pads forming a part of the printed electrical circuit on ceramic substrate 182. An additional lead 196 is connected in common with one of those pads and passes through an aperture 198 (FIGS. 7 and 9) to one side of fine tuner 65. The other side of fine tuner 65 is joined to a lead 200 (FIG. 8) which passes through an aperture 202 in the frame (FIG. 9) where it connects to the negative side of the power supply. Coarse tuner 67 has one side connected through the printed circuit on substrate 186 in common with leads 194 and 196 and its other side connected through the printed circuit to the negative side of the power supply so as to be in parallel with the fine tuner 65.

It is apparent from the above that the present invention provides a wristwatch construction having improved timekeeping accuracy. In manufacturing the watch of this invention, the batteries are inserted at the factory and the watch is adjusted at the factory before delivery to an extremely accurate timekeeping rate. It is sent to the jewelry store or to the consumer in a completely assembled operating condition so that in most instances no further adjustment is required. In this way, the manufacturer is able to adjust the watch so that the time indication does not vary by more than five seconds per month and in most instances the accuracy of the watch of the present invention is much greater than this.

For a quartz crystal oscillator operating frequency of 32,768 Hz a maximum deviation in the time display of five seconds per month represents a time-keeping accuracy of approximately $\pm$ 1.83 parts per million. As presently manufactured, quartz crystals designed for operation at this frequency customarily may have a maximum deviation in operating characteristics of approximately $\pm$ 20 parts per million. This is, the natural frequency of the crystals may deviate from crystal to crystal by this amount from the desired frequency. The increase in accuracy for the overall timekeeping rate is obtained through adjustment of the fine and coarse trimmers 65 and 67.

By way of example only, in the circuit shown in FIG. 6 the coarse trimmer 67 may typically have a capacitive range of from about 7 to 45 pf. An example of a coarse trimmer useable in the present invention is a flat variable capacitor manufactured by Johanson Technology Incorporated of Boonton, New Jersey, identified as No. 9410–4. The fine trimmer or tuner 65 may typically have a range of from about 1.5 to 5.5 pf and a fine trimmer useable in the present invention is the Johanson tubular trimmer identified as No. 7250–3.

In setting the timekeeping rate of the watch of the present invention the fine tuner 65 is first set to the mid point of its frequency range. This can be determined by adjusting it to maximum and minimum frequency outputs and then selecting the position which produces an output frequency midway between the two extremes. The desired timekeeping rate is then obtained by adjustment of the flat coarse tuner 67 which because of its relatively wide range makes it possible to adjust the output frequency to the desired value even though the particular crystal in that wristwatch may deviate from the desired output frequency by as much as $\pm$ 20 parts per million. A final small adjustment of the fine tuner 65 may or may not be required but in any event the fine tuner remains at or close to its center frequency point. The wristwatch is delivered to the jeweler or consumer in operating condition with the fine tuner 65 at or near its mid point position.

In this way, it is possible through suitable indicia on the tuner or by way of an instruction pamphlet or brochure to notify the jeweler or owner in which direction the tubular fine trimmer 65 need be rotated and approximately how much to obtain a desired adjustment such as an increase or decrease of one second per month in timekeeping rate. The tubular fine trimmer previously described is a type that undergoes 360° of rotation and may be rotated in either direction continuously. Conventionally, the fine tuner is adjusted so that a turn in the counterclockwise direction of the adjusting screw 210 as viewed in FIG. 9 increases the oscillator output frequency while turning in the clockwise direction as viewed in FIG. 9 results in a reduction in the frequency of the oscillator output. This adjustment can be effected by removing the backplate of the wristwatch as previously described and inserting a small screwdriver or other suitable tool into the slot of the turning screw 210. The coarse tuner 67 is adjusted at the factory and is not intended for further adjustment. This is accomplished by inserting a tool in the nature of an Allen wrench into a rectangular well 212 of the coarse tuner as illustrated in FIG. 7 and rotating to the desired position. Through the double tuning arrangement of the present invention and the ready adjustment of the fine tuner from time to time as may be required extreme time-keeping accuracies are obtained and time deviations of one second or less per month with the wristwatch of the present invention are not at all unusual.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A wristwatch comprising a watch case having a removable portion and a viewing window, an electro-optical digital seconds display in said case and viewable through said window, a crystal controlled oscillator in said case acting as a substantially constant frequency time base source for said seconds display, said crystal controlled oscillator including both coarse and fine variable tuning capacitors, said fine tuning capacitor being located adjacent said removable portion of said watch case for ready access and ease of adjustment.

2. A wristwatch according to claim 1 wherein said fine tuning capacitor is set to approximately the midpoint of its tuning range.

3. A wristwatch according to claim 1 wherein said removable portion of said watch case comprises a removable back plate.

4. A wristwatch according to claim 3 including a frame in said case, said coarse tuning capacitor and said seconds display being mounted on the side of said frame adjacent said viewing window, said fine tuning capacitor being mounted on the side of said frame adjacent said back plate.

5. A wristwatch according to claim 4 including a power supply in said case between said frame and said back plate.

6. A wristwatch according to claim 1 wherein said seconds display comprises a plurality of light-emitting diodes.

7. A wristwatch according to claim 1 wherein said seconds display comprises a plurality of liquid crystals.

* * * * *